United States Patent
Levine et al.

(10) Patent No.: US 6,446,062 B1
(45) Date of Patent: Sep. 3, 2002

(54) METHOD AND APPARATUS FOR IMPROVING THE PERFORMANCE OF A GENERATED CODE CACHE SEARCH OPERATION THROUGH THE USE OF STATIC KEY VALUES

(75) Inventors: Donald P. Levine, Glendale; Anne Marie Wunderlin, Sun City West; David A. Egolf, Glendale, all of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/472,113

(22) Filed: Dec. 23, 1999

(51) Int. Cl.[7] .............................................. G06F 17/30
(52) U.S. Cl. .................... 707/3; 707/2; 707/8; 707/101
(58) Field of Search ........................... 707/2, 4, 8, 101, 707/3

(56) References Cited

U.S. PATENT DOCUMENTS

| | | | | |
|---|---|---|---|---|
| 5,794,229 A | * | 8/1998 | French et al. | 707/2 |
| 5,897,634 A | * | 4/1999 | Attaluri et al. | 707/8 |
| 5,918,225 A | * | 6/1999 | White et al. | 707/3 |
| 6,073,129 A | * | 6/2000 | Levine et al. | 707/4 |
| 6,105,033 A | * | 8/2000 | Levine | 707/101 |
| 6,115,703 A | * | 9/2000 | Bireley et al. | 707/2 |
| 6,341,288 B1 | * | 1/2002 | Yach et al. | 707/103 R |
| 6,353,820 B1 | * | 3/2002 | Edwards et al. | 707/2 |

* cited by examiner

Primary Examiner—Charles L. Rones
(74) Attorney, Agent, or Firm—Faith F. Driscoll; James H. Phillips (57) ABSTRACT

A cache manager of a relational database management system (RDBMS) is able to bypass time consuming search operations through the use of a key memory structure and locate generated code segments within an SQL cache within a minimum of time. The SQL cache contains the generated code segments used to execute SQL statements as well as the structures and program logic used for maintaining the cache. The key memory structure is located in an area of memory utilized by the SQL runtime routines in executing applications. The runtime routines provide an interface between the application and the RDBMS.

25 Claims, 10 Drawing Sheets

METHOD AND APPARATUS FOR IMPROVING THE PERFORMANCE OF A GENERATED CODE CACHE SEARCH OPERATION THROUGH THE USE OF STATIC KEY VALUES

RELATED PATENT APPLICATIONS

The patent application of Donald P. Levine and David A. Egolf, entitled: A Method and Apparatus for Improving the Performance of a Database Management System Through a Central Cache Mechanism, bearing Ser. No. 08/999,248 filed on Dec. 29, 1997, assigned to the same assignee as named herein which issued on Jun. 6, 2000 as U.S. Pat. No. 6,073,129.

BACKGROUND OF THE INVENTION

1. Field of Use

The present invention relates to data management systems and more particularly to searching mechanisms utilized by such systems.

2. Prior Art

As known in the art, to conserve space in a database, it becomes desirable that the stored data values not be unnecessarily duplicated. Therefore, in a relational database, instead of having one very large table to hold duplicate data values, the user generally creates several smaller tables that contain unique data values that are related to each other through common attributes. A user can retrieve data for a given set of criteria by "joining" the smaller tables to represent the large table. Data is extracted from the system using a query command that locates all rows in a table or tables that meet specified criteria. In such systems, one of the most expensive operations to conduct in terms of time and resources is the "join operation" which joins together two or more entire relations that can be fairly large. When multiple joins are present in a user generated query, as is the typical case, the cost of processing the query increases dramatically. Thus, the time expended in developing, optimizing and processing complex queries can be exceedingly costly in terms of time and resources. This is particularly true as more and more complex data types are required to be processed.

In the prior art, a number of systems utilize database query statements (in the form of SQL) that can be specified within programs written in a commercially available computer language, such as COBOL 85. The language runtime routines call a relational database management system (RDBMS) that processes the SQL statement, accesses the database to retrieve (or store) the desired data in the database and passes the data back to (or from) the requesting program. To improve system performance in the repeated use of SQL statements, the system generates a sequence of machine instructions that executes the logic of a particular SQL statement. Such sequence of machine instructions is referred to as "generated code". The generated code is stored in a cache referred to as a "SQL cache" where it can be retrieved and used again on subsequent executions of the same SQL statement. This "caching" eliminates the need to extensively process particular SQL statements more than once. In this system, when a SQL statement is encountered, a cache lookup operation is performed comparing the properties or attributes of the SQL statement and the datatypes involved with those stored in the cache. These attributes include the text of the SQL statement, the name of the cursor, if any, the number, types, and lengths of host variables referenced by the statement, the model name and the owner name. When a match is found in the cache, the associated generated code is executed to perform the actions prescribed by the SQL statement.

This approach has allowed the system in certain cases to bypass the steps of query optimization and code generation when the system encounters an identical SQL statement during the execution of a particular process. Since programs that access databases often repeatedly execute identical SQL statements, the use of an SQL cache with each process was been found to significantly improve performance. An example of a system that makes use of an SQL cache is the INTEREL product developed and marketed by Bull HN Information Systems Inc. For information concerning this product, and the SQL cache in particular, reference may be made to the publication entitled "Database Products INTEREL Reference Manual INTEREL Performance Guidelines", Copyright, 1996 by Bull HN Information Systems Inc., order no. LZ93 Rev01B and later revision Rev04 that is available at URL www.enterprise.bull.com/cd_doc.

While the above approach has increased performance, it still takes considerable time to process complex statements in those instances where the particular process being run has previously processed the same identical statement. That is, the attributes of the SQL statement are used to search the SQL cache for code that has already been generated for the particular statement. Therefore, in the case of complex SQL statements, substantial time still must be expended in searching for the applicable generated code.

Accordingly, it is a primary object of the present invention to provide a more efficient searching process and mechanism for improving system performance.

It is a further object of the present invention to provide a more extensive and flexible approach in processing complex statements.

SUMMARY OF THE INVENTION

The above objects are achieved in a preferred embodiment of the present invention through the use of a key memory structure used to locate applicable generated code within "cache". The cache corresponds to the previously discussed SQL cache that stores generated code to execute the SQL statements as well as the structures and program logic used for maintaining the cache. The key memory structure is located in an area of memory associated with and utilized by the SQL runtime routines that are bound with the application program. This area of memory is located in the address space of the process executing the program that contains the SQL statements. This area is not directly accessible by the program. The runtime routines provide an interface between the program that contains the SQL statements and a relational database management system (RDBMS). The RDBMS contains a cache manager and the SQL cache. The cache manager contains the logic functions that are used to maintain and search the SQL cache.

In the preferred embodiment, the area of the memory in which a single key resides is referred to as a "key area" and the content of such key area when a key is stored therein is referred to a "key value". An initialized key area is provided for each SQL statement embedded in the application program. The key area is in the area of memory associated with so-called "static variable" storage as is known in current language environments, that is, the content of such memory is retained between executions of the runtime routines and is automatically initialized at program invocation.

On the first execution of each SQL statement, the code generated for executing the particular statement is stored in the SQL cache. A "node" or "node entry" of a node structure having an array of entries, maintained by the cache manager, is populated with information associated with the statement as well as a pointer to the generated code segment. The cache manager then stores a key value associated with the generated code segment in the allocated key area.

During operation, the runtime routines pass a reference (e.g. address value) to the key area associated with the SQL statement across the runtime interface to the RDBMS software which, in turn, passes the reference to the cache manager along with such statement. The cache manager performs a search of the SQL cache in accordance with the present invention by using a first value within the key to access the node structure associated with the SQL cache to locate the node entry associated with a particular code segment. Then, the cache manager performs successive key validation tests with other values included in the key relative to values included in the allocated node. If the key is validated, that is, if this check confirms that the code is associated with the key, a cache hit is signaled and the search is complete.

More specifically, the validation check operates as follows. A "node id" value in the key is used to access the particular node entry within the SQL cache structure. In the preferred embodiment, this is merely an array index, but other means of addressing could be used. Then a "code token" value within the key is compared to the "code token" value in the node entry. In the preferred embodiment, the "code token" is the pointer to the generated code. In addition, a "timestamp" value in the key is compared to a "time inserted" value within the node entry. In order for the key to be valid, that is, be a valid locator of the code associated with the node, the code token and time values from the key must each match their respective values in the node entry. If either set of values does not match, the key is deemed invalid and the cache search is not deemed to result in a "hit". A more extensive cache search must then be performed to determine whether the requested item is in the cache.

The reason for using and checking these values is that merely storing a pointer to the generated code in the storage associated with a program or its runtime routines is not sufficient for reliably locating code in the SQL cache. This is because SQL entries are subject to deletion and replacement and may be used by multiple programs.

The ability to pass a key to the cache manager on subsequent executions of a particular statement to access the potential associated entry in the SQL cache enables bypassing of much of the cache search mechanism resulting in faster cache "hits". This in turn results in improved cache system performance.

The above objects and advantages of the present invention will be better understood from the following description when taken in conjunction with the accompanying drawings.

DESCRIPTION OF THE PREFERRED EMBODIMENT

Figure 1:
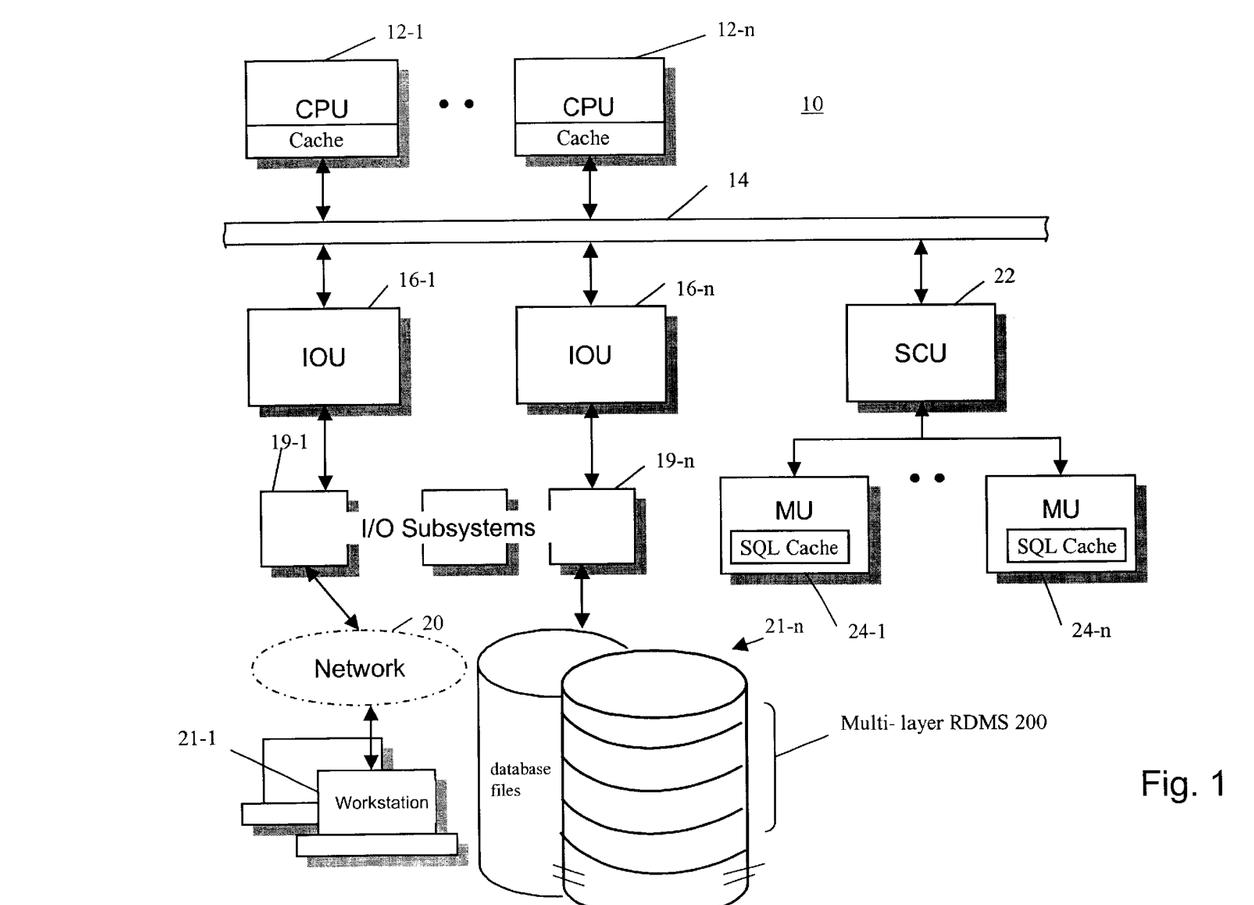
FIG. 1 is an overall block diagram of a data processing system that can utilize the teachings of the present invention.

FIG. 1

FIG. 1 is a block diagram of a conventional data processing system 10 that utilizes the cache organization of the present invention. As shown, the system 10 includes a plurality of processing units 12-1 through 12-n which connect to a system bus 14 through their individual physical caches in common with a number of input/output units (IOUs) 16-1 through 16-n and a system control unit (SCU) 22. As shown, each IOU couples to a particular I/O subsystem (i.e. 19-1 through 19-n) which in turn connect to anyone of a number of different types of devices both local and remote such as workstations 21-1 via a network 20 or disk mass storage units 21-n as indicated.

The SCU 22 connects to a number of memory units (MUs) 24-1 through 24-n. For the purpose of the present invention, system 10 may be considered conventional in design and may for example utilize a mainframe computer system such as the DPS9000 manufactured by Bull HN Information Systems Inc. which operates under the control of the GCOS8 operating system. The relational database management system processes all user requests for accessing the files contained on disk storage 21-n. Users initiate such requests via the network 20 by executing transaction processing routines or batch decision support programs via their workstation keyboard and/or via other input devices (e.g. mouse). The system 10 upon receiving an SQL query operates to initiate a search of the relational database files to obtain the data requested by the user.

In system 10, all user SQL queries are presented to a relational application manager component that forms part of a relational database management system (RDBMS) such as INTEREL software that runs under the GCOS8 operating system. The INTEREL software further includes a host based relational file manager (RFM) and an Operational Directory Interface (ODI) used for the storage of directory information. These components are described in greater detail in the publication entitled Bull Users Society Fall Conference Proceedings, Copyright, 1991 by Bull HN Information Systems Inc. These components are discussed herein only for the purpose of completeness. For ease of reference, a glossary is included that defines such components as well as various terms used herein. The items included in the glossary are provided as an aid in understanding the preferred embodiment of the present invention and should not be construed as limiting any aspects of the present invention since other definitions of such items may also be applicable.

Figure 2A:
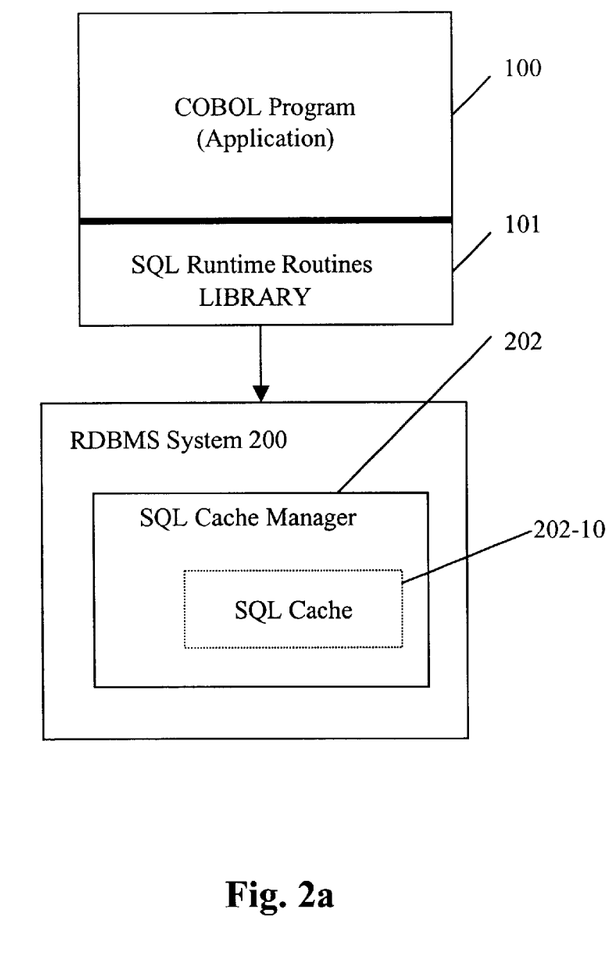
FIG. 2a is a block diagram illustrating the cache system organization according to the teachings of the present invention.

FIG. 2a-Cache Organization

FIG. 2a depicts the context of the cache manager 202 that utilizes the teachings of the present invention. The different components shown are indicated as being stored in memory unit 24-1 of FIG. 1. As shown, these components include an application program 100 that corresponds to COBOL program, a Runtime Library 101 that serves as the application program's interface to the cache manager 202. The cache manager 202 cooperates with a number of different components of the RDBMS 200 that are not shown. Such components include a SQL Director Component, a Common Component, a Relational Access Manager (RAM) component, a Code Generation component which contains support routines for acquiring information stored in a number of "Code Generation" structures relating to code which has been generated and the Operational Directory Interface (ODI) component mentioned above. The cache manager includes a SQL cache 202-10 that stores the code generated by the code generation component for executing processed SQL statements. For further information regarding the RDBMS components associated with the cache manager, reference may be made to the cited related patent application of Donald P. Levine et al.

As indicated, the Runtime library 101 contains runtime routines bound into the application used by the application 100 for issuing calls. Each such call results in library 101 sending a SQL query statement along with other information according to the present invention to cache manager 202 (i.e. to the director component associated therewith). The associated director component contains routines which analyze each query SQL statement for determining if the statement is of a type that accesses RFM database files and thus is suitable for code generation and storage in the SQL cache 202-10. The director component also contains routines that generate calls to the Cache Manager 202 to see if the code for that statement can be found in the SQL cache 202-10. When code for that statement is not found in the SQL cache, the director component calls the relational access manager via the common component to process and potentially execute the SQL statement. Some aspects of this overall flow is generally illustrated in FIG. 2c.

Figure 2B:
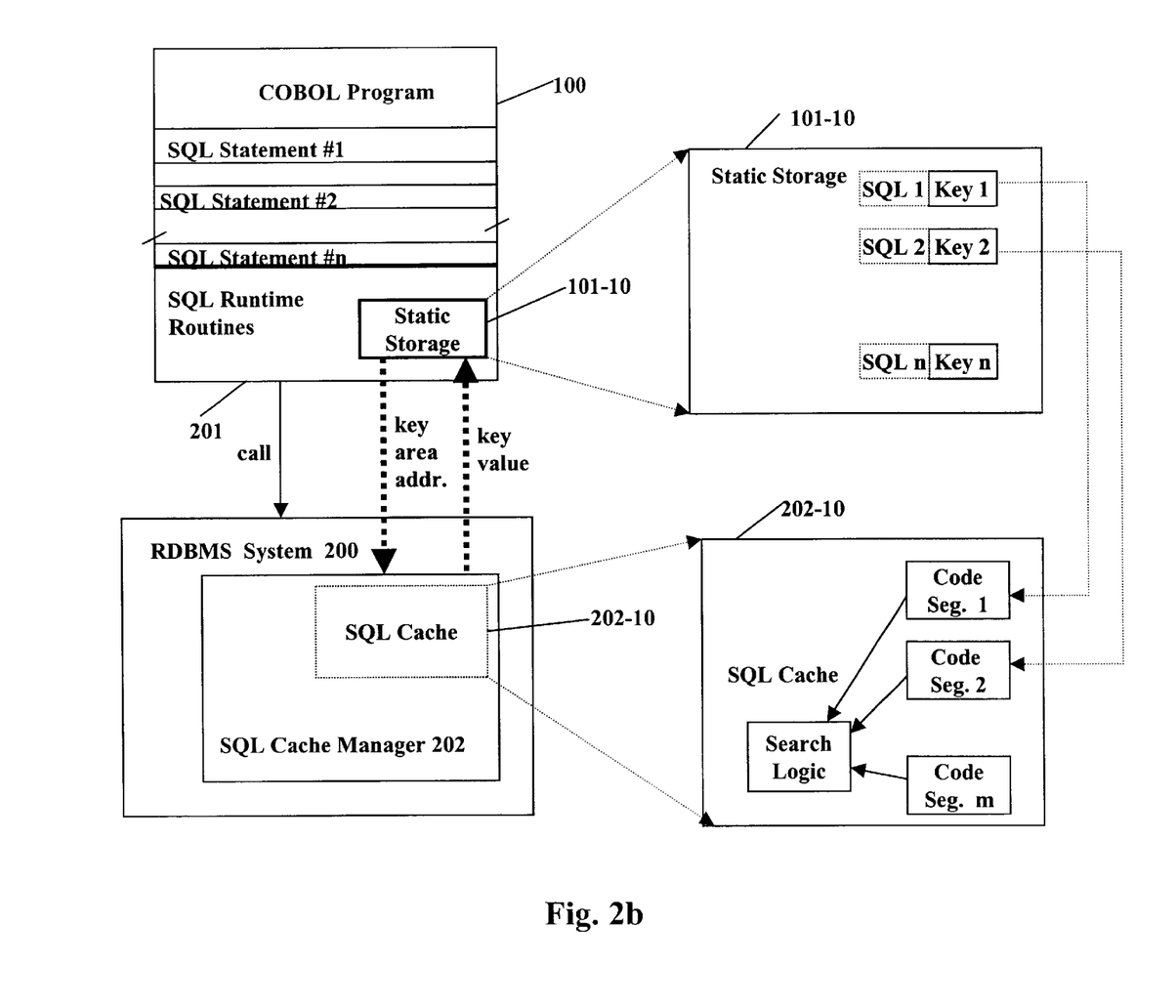
FIG. 2b is a block diagram illustrating in greater detail, the cache system organization according to the teachings of the present invention.
Figure 2C:
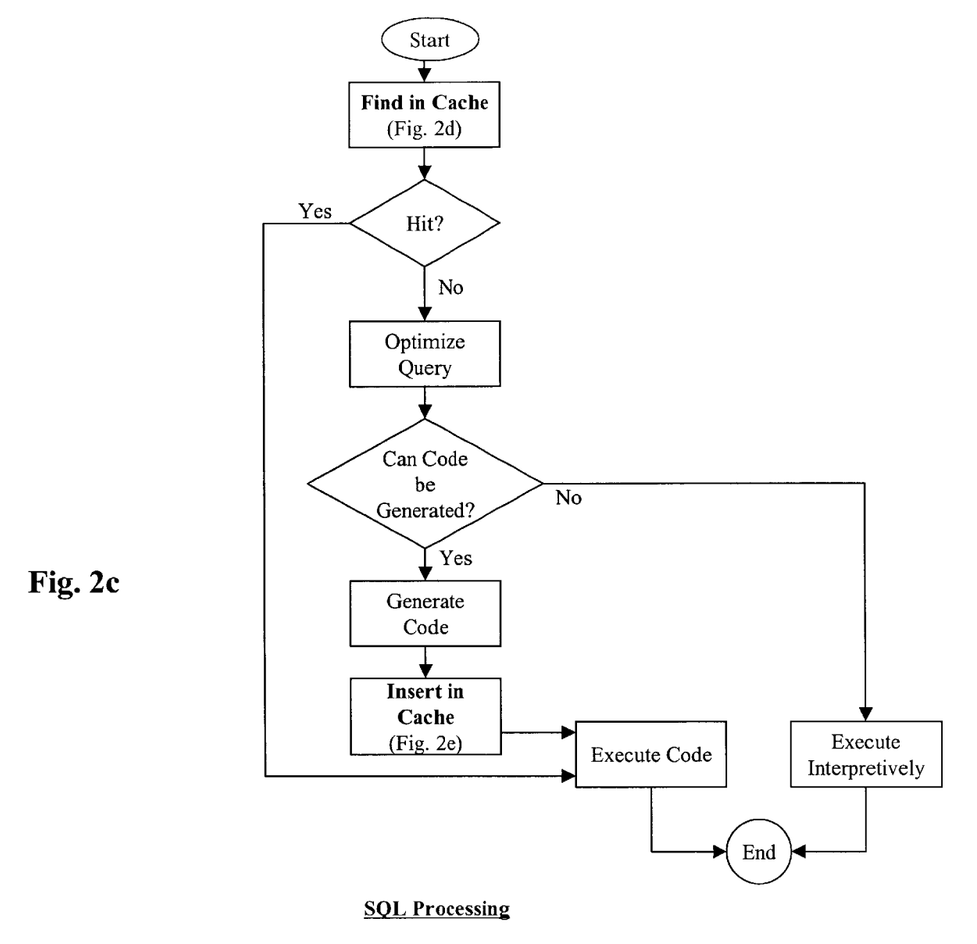
FIG. 2c illustrates the overall operational flow of the cache manager in processing an SQL statement.

FIG. 2b-Cache System Organization

FIG. 2b shows in greater detail, the components utilized by the present invention contained in the Cache System organization of FIG. 2a. As shown, in accordance with the teachings of the present invention, the SQL runtime routine library 101 has associated therewith, a key memory structure in the form of static storage 101-10. This storage is static in that the content of such memory is retained between calls to the library runtime routines and is automatically initialized at program invocation.

In accordance with the present invention, the static storage 101-10 is used to locate applicable generated code in SQL cache 202-10. The static storage 101-10 includes a plurality of memory areas termed "key areas", each key area for storing a single key termed a "key value" whose structure is shown in detail in FIG. 3. The key areas exist in application runtime storage and are not directly accessible by the application program 100.

Figure 2D:
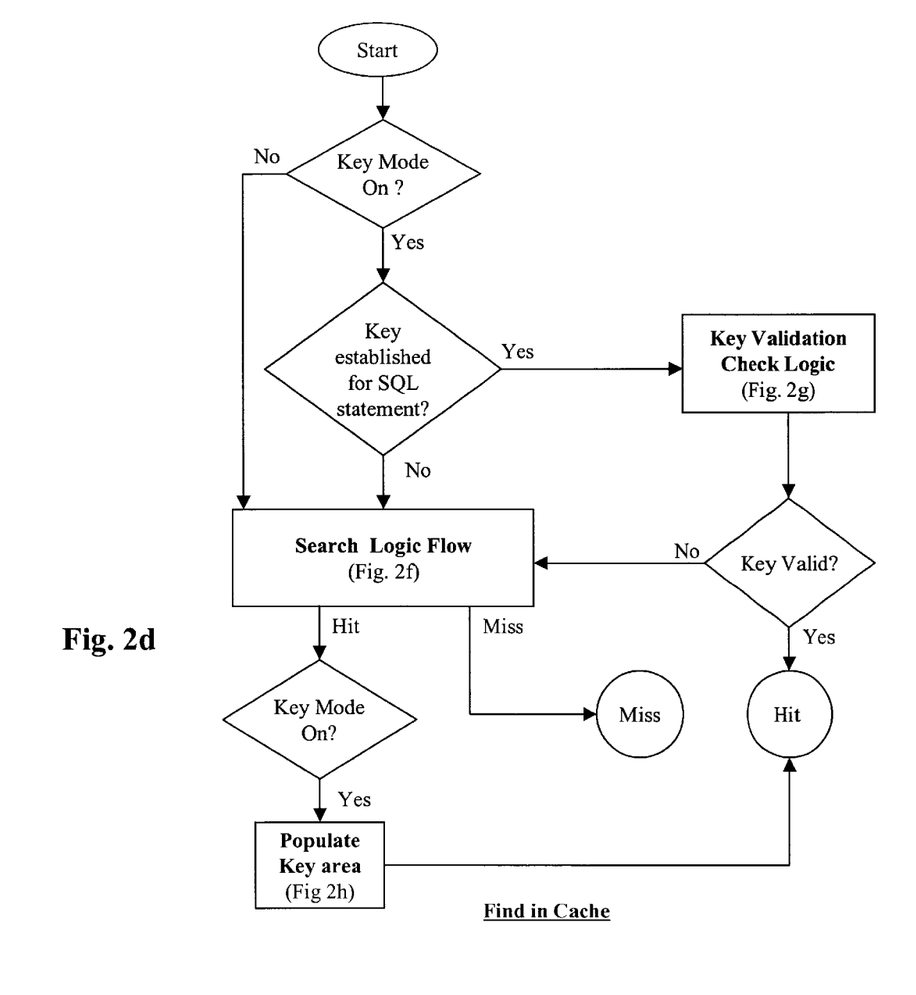
FIG. 2d illustrates in greater detail, a portion of FIG. 2c pertaining to locating an applicable code segment in the SQL cache of FIG. 2b for executing a particular SQL statement according to the teachings of the present invention.
Figure 2E:
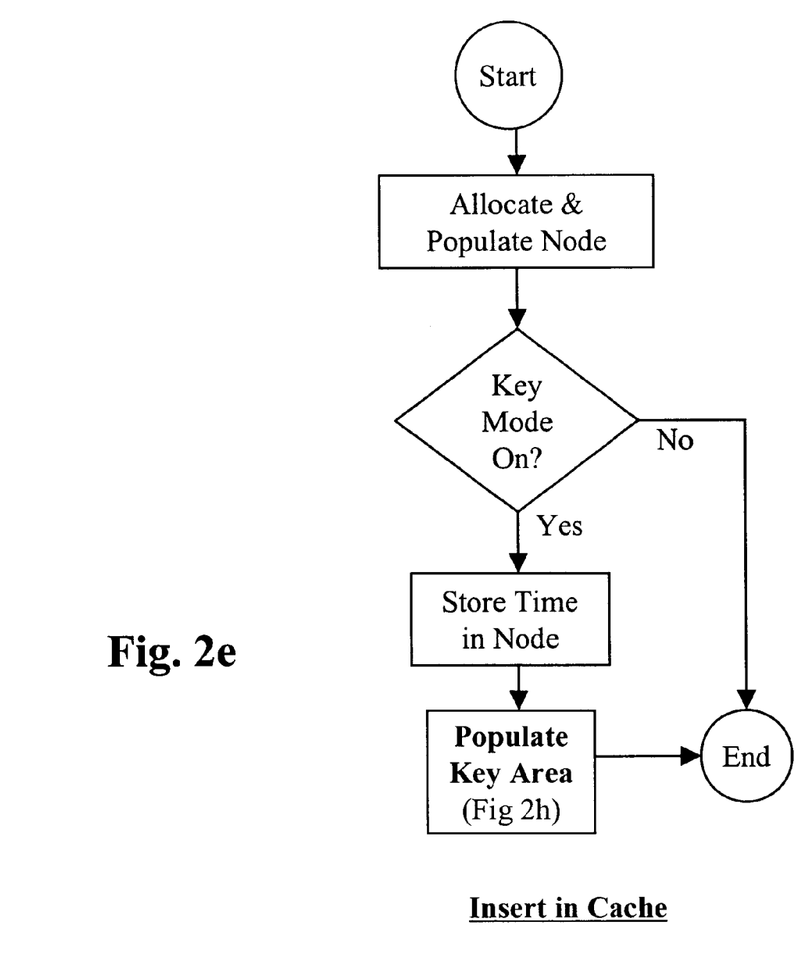
FIG. 2e illustrates in greater detail, another portion of FIG. 2c pertaining to inserting a code segment into the SQL cache of FIG. 2b according to the teachings of the present invention.
Figure 2F:
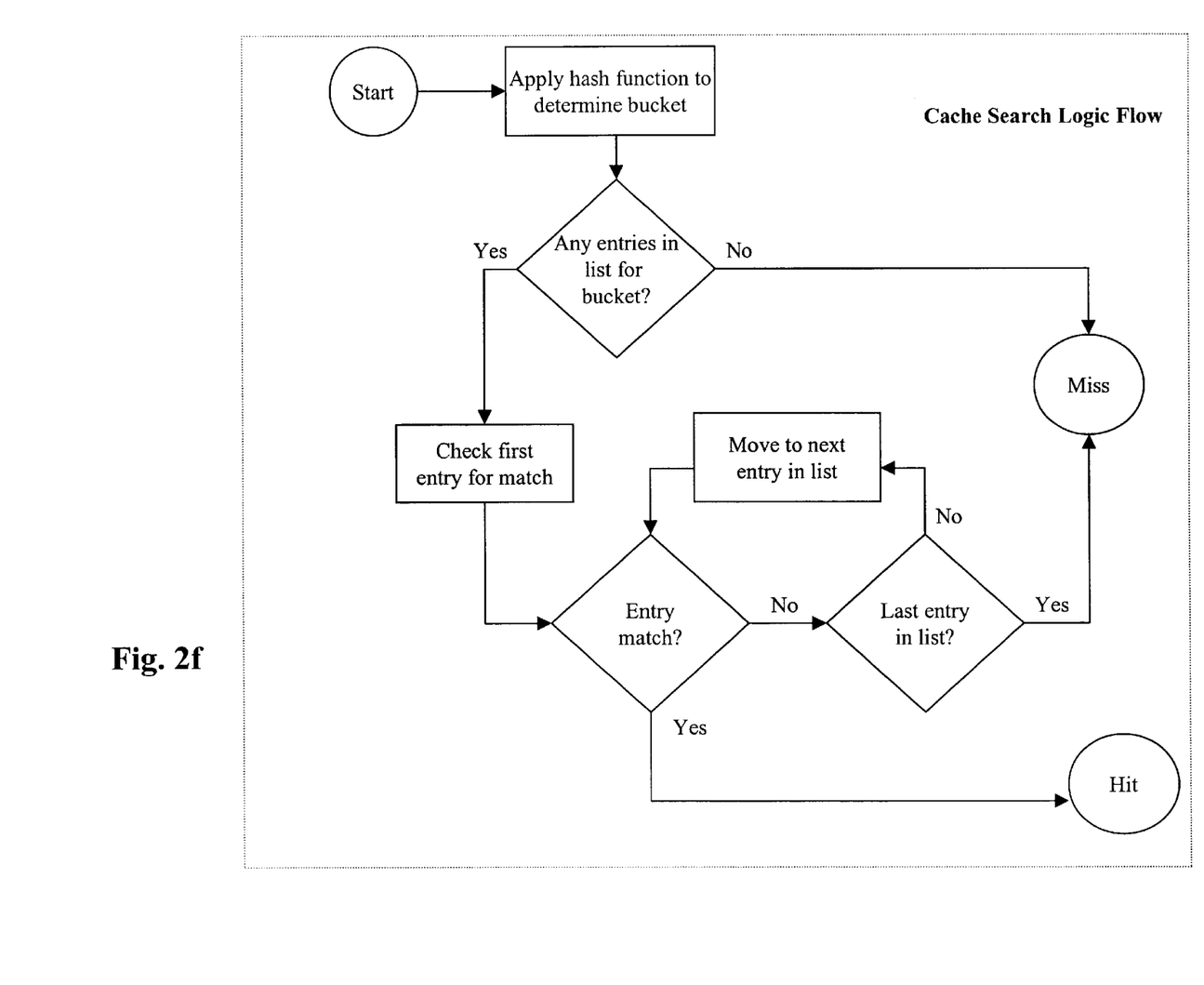
FIG. 2f illustrates the prior art search flow mechanism associated with the SQL cache of FIG. 2b utilized in FIG. 2d.

The SQL cache 202-10 utilizes a search logic mechanism whose flow is illustrated in FIG. 2f that determines if a code segment is stored in cache as part of processing SQL statements received from cache manager 202 as described in greater detail herein. As previously indicated, cache manager 202 controls the storage of generated code within SQL cache 202-10.

FIG. 2c-SQL Processing Flow

FIG. 2c illustrates the overall flow in processing each SQL statement. As indicated, such statement processing involves invoking the cache manager 202 which executes a find in cache function illustrated in greater detail in FIG. 2d. In the prior art, this function had to perform a lengthy complex search operation utilizing attributes contained in the SQL statement. As discussed herein, the cache manager's "find in cache" function has been modified to incorporate the teachings of the present invention that enables bypassing such search operation.

When the "find in cache" function produces a "hit", this results in the execution of the code obtained by such search operation. If the cache manager produces no "hit", then the query is optimized and next, a determination is made if the code can be generated. If it can not, then the query is executed interpretively. When the code can be generated, it is generated and the cache manager is invoked which then executes an "insert in cache" function to store the generated code in the SQL cache 202-10. As discussed herein, the cache manager's "insert in cache" function has been modified to incorporate the teachings of the present invention that permits the bypassing of the search operation.

FIG. 2d-Cache Find Function

FIG. 2d illustrates in greater detail, the cache manager's "find in cache" operation of FIG. 2c pertaining to locating an applicable code segment within the SQL cache 202-10 of FIG. 2b as modified according to the teachings of the present invention. More specifically, the cache manager 202 utilizes the static storage 101-10 enabling the bypassing of a portion of the prior art search operation illustrated in FIG. 2f including the hash function calculation and the bypassing of potentially repeated entry comparison checking under certain circumstances. This dramatically reduces the time required during the cache search to determine a hit condition. As indicated in FIG. 2d, the cache manager 202's cache find function has been modified to include a key mode test and a key validation check logic function. The key validation check logic is illustrated in greater detail in FIG. 2g.

As discussed in greater detail herein, the key mode test allows for backward compatibility as well as mixed runtime versions. The key validation check logic function ensures when a key value is used that the appropriate cache entry is used notwithstanding replacement or deletion of cache entries. Also, as indicated, the cache manager's "find in cache" function further includes a populate key area function that is illustrated in greater detail in FIG. 2h.

FIG. 2e-Cache Insert Operation

FIG. 2e illustrates in greater detail, the cache manager's "insert in cache" function of FIG. 2c for inserting a code segment into the SQL cache 202-10 of FIG. 2b as modified according to the teachings of the present invention. As shown, the cache manager 202 utilizes several functions to perform an "insert in cache" operation. The first function is an allocate and populate node function utilized in the prior art for inserting the appropriate entries into the node structure associated with the cache 202-10.

In the preferred embodiment, there is a node entry associated with each generated code segment. In the prior art, a node entry operationally contained information about the generated code as well as linking information used to link the node entry within a couple of linked lists. This information includes the code token (i.e. a pointer to the generated code segment), a model token (i.e. used to differentiate between different database models), the size of the generated code segment, the hash intermediate value, a value that represents the type of SQL statement, the bucket number of the bucket list that contains this entry, and code usage count.

Other pieces of information are logically stored within the node entry, but in the preferred embodiment, are physically stored in a parallel structure, also indexed by node id. Functionally, these items act as if they are part of the node entry and are only separate to maintain the node size to be a power of two to allow more efficient addressing (i.e. calculation of the entry address by using arithmetic shift processor instructions instead of the more CPU-expensive multiply instruction). These extra pieces of information include the "next" and "previous" links within the hash bucket linked list within which this entry is linked, and the "next" and "previous" links within a most-recently-used list. The present invention adds an additional field of "time inserted" into the node; however, in the preferred embodiment, this element is maintained in a separate array but parallel to the node structure. Logically this field is operationally part of the node structure and subsequent discussions refer to this field as part of the node entry.

The first function is the only function required in the prior art cache manager to execute the "insert in cache" function. According to the teachings of the present invention, the cache manager's "insert in cache" function has been modified to include a "key mode on" test, a "store time in node" operation and a "populate key area" function shown in greater detail, in FIG. 2h. The key mode test determines if the cache manager is to utilize the static storage structure that enables bypassing the complex search operation. The "store time in node" function is executed by the cache manager for inserting the appropriate time value described herein into the allocated node. The "populate key area" function is executed by cache manager 202 to enter the appropriate values of a key formatted as illustrated in FIG. 3.

FIG. 2f-Cache Prior Art Search Function

The SQL cache 202-10 utilizes a search function that performs the prior art search operations of FIG. 2f. As indicated in FIG. 2f, the search utilizes a hash method in order to handle searches involving thousands of potential entries to be searched. The hash function takes, as input, properties or attributes of the SQL statement, including normalized SQL statement length and text, the number, type and length of host variables, the used indicator variables and the name of the cursor, if any. In the preferred embodiment, the hash function involves calculating the checksum of these items or values representing these items to provide a "hash intermediate value". This value is divided by the number of buckets (i.e. a prime number) and the remainder of the result is used to determine the bucket. The hash intermediate value is calculated during the search of the SQL cache 202-10.

The cache manager's search function compares the entries in the calculated bucket list until it detects a match in which it signals as a hit or until all of the entries in the list have been examined in which case, it signals a miss. When traversing a bucket list comparing entries for a hit, the SQL cache manager 202 uses as the criteria for a hit, identical matches of the following items/attributes: cursor name if any; statement type; host variable number, type and length if any; statement text; secondary text (i.e. the SELECT text associated with a FETCH statement); owner name; model name; and executing user id name.

The bucket lists are doubly-linked lists to allow simple removal of entries that are not at either end of the list. The number of buckets used is equal to the prime number less than or equal to the configured maximum number of cache entries. With a reasonable distribution across the buckets, the number of entry match comparisons can be kept to a minimum.

As seen from the above, there are a number of attributes that are used for computing the hash function, including potentially long character strings. Therefore, the computation of the hash function can be relatively CPU intensive. Also, it can be CPU intensive to compare the various attributes during the entry match determination that is performed on the entries in the bucket lists.

Figure 2G:
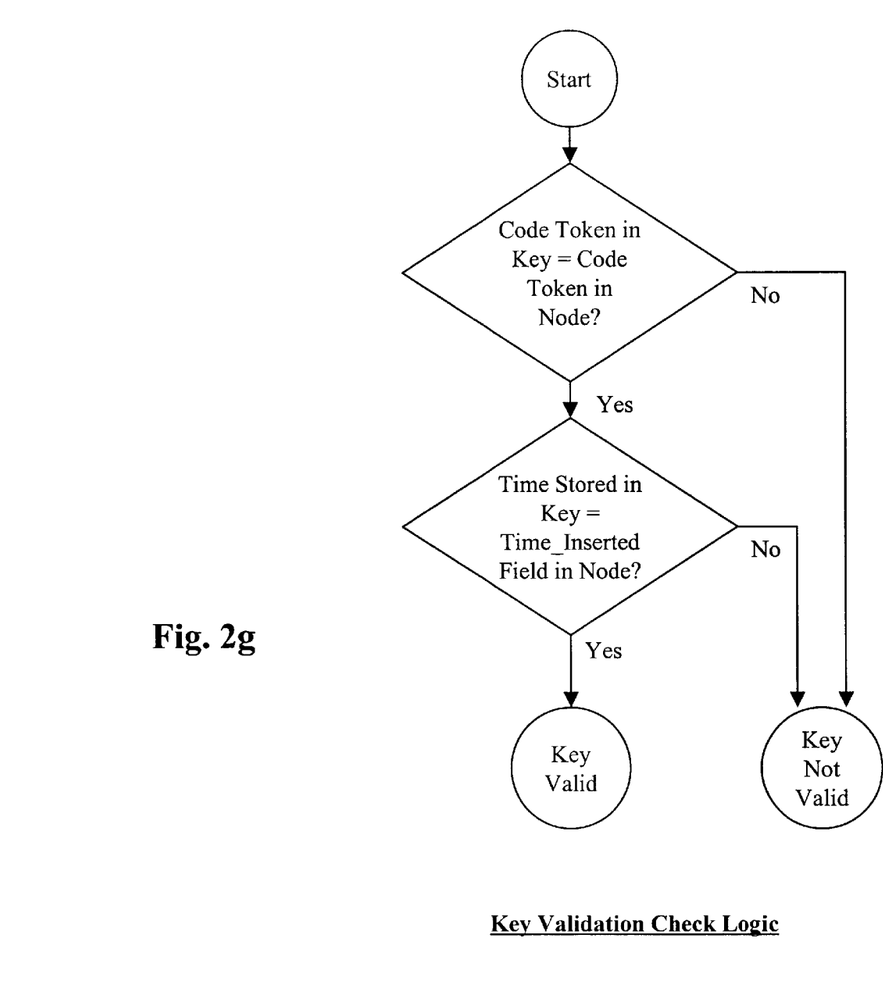
FIG. 2g illustrates in greater detail, the key validation check logic utilized in FIG. 2d according to the teachings of the present invention.

FIG. 2g-Key Validation Check Logic Function

FIG. 2g illustrates in greater detail, the operations performed by the key validation function utilized by cache manager 202. As indicated, this function performs two successive comparison operations for determining if a key is valid. These operations are comparing values contained within fields of the key whose structure is illustrated in FIG. 3 with the corresponding values contained within the applicable node specified by a further value within the key. More specifically, first, the key validation check function compares the code token value in the key with the code token value in the applicable node entry.

If the results of this operation indicate there is not an identical comparison between the two code token values, the key validation check logic function signals that the key is not valid. In the case of an identical comparison, the key validation check logic function next compares the time value stored in the key with the time value contained in the time_inserted field of the applicable node. When there is an identical comparison between the time values, the key validation check logic signals that the key is valid. In the absence of an identical comparison, the logic function signals that the key is not valid.

Figure 2H:
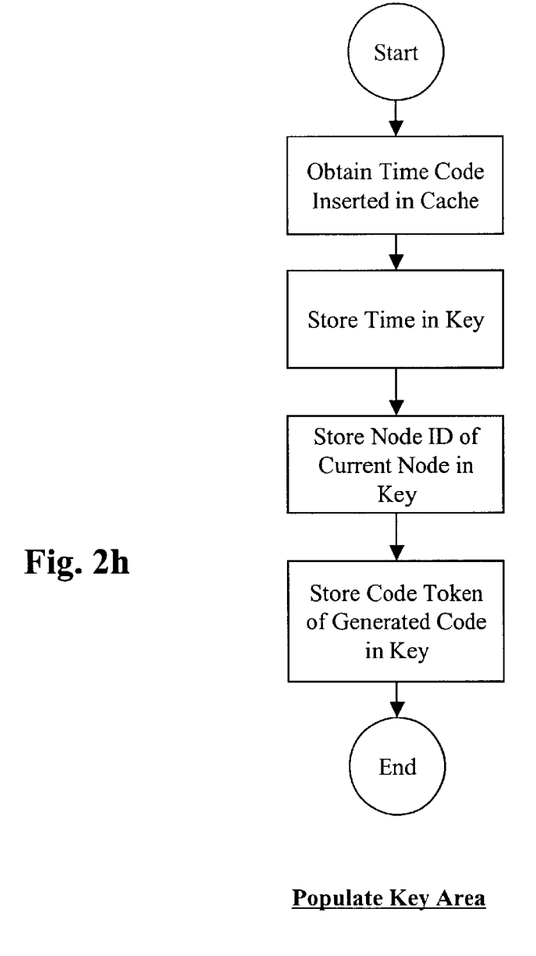
FIG. 2h illustrates in greater detail, the populate key area function of FIG. 2d according to the teachings of the present invention.
Figure 3:
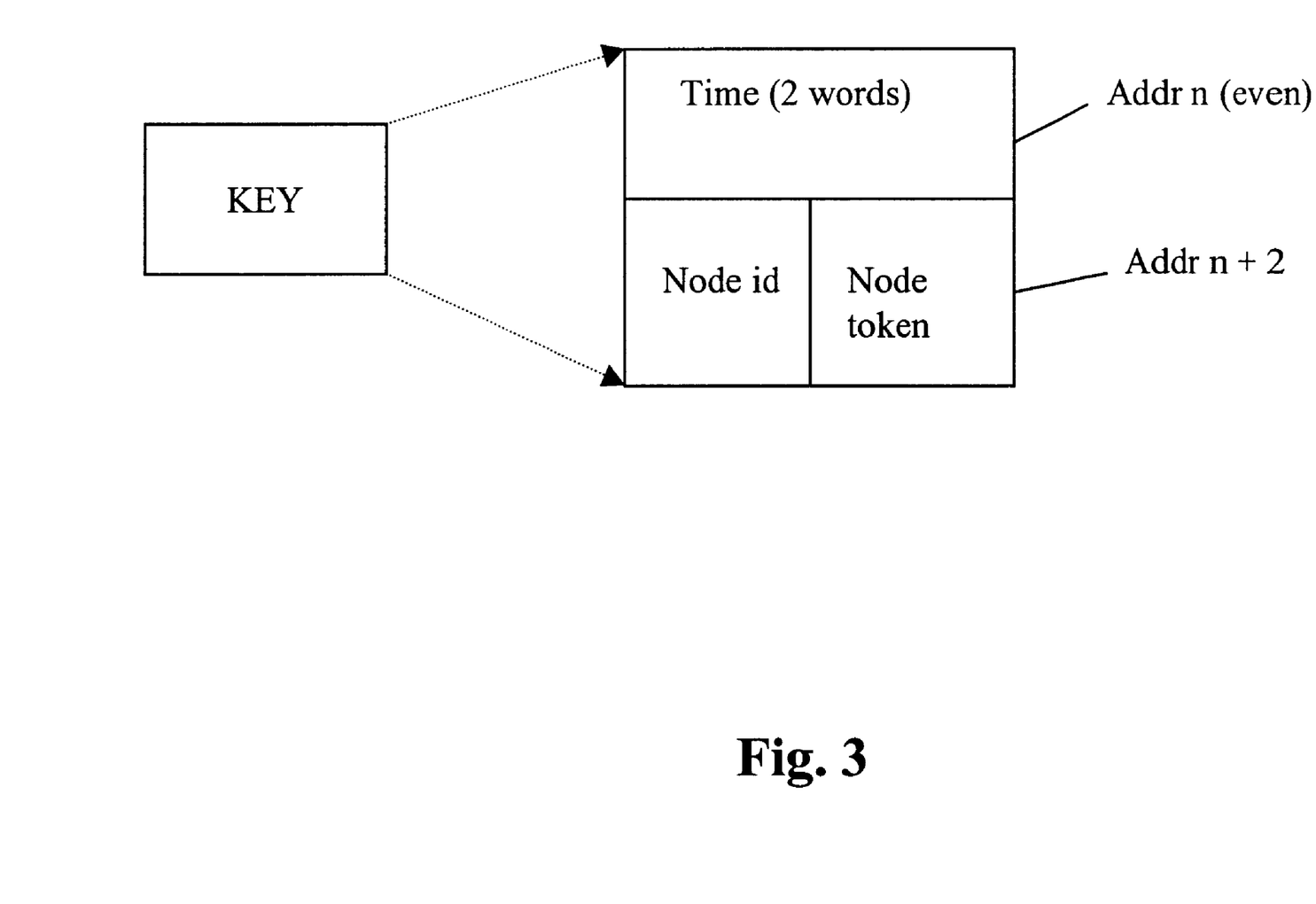
FIG. 3 illustrates the structure of the key according to the present invention.

FIG. 2h-Populate Key Area Function

FIG. 2h illustrates in greater detail, the operations performed by the populate key area function utilized by cache manager 202. As indicated, this function performs several store operations for inserting the appropriate values into different fields included in the key. These fields are illustrated in detail in FIG. 3. More specifically, the populate key area function first captures the time that the code was inserted in the cache and then stores that value in one of the fields of the key. The time value is obtained from the time_inserted field of the current node entry. Next, the populate key area function stores the node ID of the current node in another field of the key. Lastly, the populate key area function stores the code token of the generated code in a further field of the key.

FIG. 3-Key Structure

FIG. 3 illustrates the structure of the "key" in greater detail. As shown, the key includes three fields: a time field, a node id field and a code token field. The time field is a two word field that contains a floating point numerical value that represents time-inserted; that is, the time that a code entry has been inserted into the SQL cache 202-10. The node id field is a one-word field that contains a number that is used to identify a node entry in the SQL cache 202-10's node structure. In the preferred embodiment, this number is an index into an array of node entries that make up the node structure. The code token field is a one-word field that is used to identify a particular sequence of generated code. In the preferred embodiment, this is a hardware usable pointer to an area of the data heap of the executing process in which the generated code resides.

DESCRIPTION OF OPERATION

With reference to FIGS. 1 through 3, the operation of the present invention will now be described with particular reference to FIG. 2d. As discussed relative to FIG. 2c, cache manager 202 executes the "Find in Cache" operation of FIG.

2d during the normal processing of an SQL statement. As shown in FIG. 2d, cache manager 202 according to the present invention first determines if the "key mode" is on. This mode is on in versions of the library runtime routines that support key storage and is off in previous versions. This provides for backward compatibility in such systems. The key mode is implemented as an indicator bit within the information passed to the cache manager 202 by the language runtime software being run. Thus, whether the key mode is on is typically a function of the version of the language runtime software that is being used in a system.

The runtime routine software called by the application 100 (e.g. COBOL program) passes this information to the RDBMS System 200, which passes the information to the cache manager 202 along with the SQL statement. The cache manager 202 uses the node id within the key to access a node entry within the node structure associated with the SQL cache 202-10. The cache manager's key validation check logic function of FIG. 2g compares the code token within the key to the code token in the cache node structure. If they are not equal, then the cache manager 202 continues the search utilizing the prior search function of FIG. 2f starting with the calculation of the hash function.

If the code tokens are equal, the cache manager 202 performs a second test using the key validation check logic function of FIG. 2g. The key validation check logic function compares the "time inserted" time within the key to the time inserted within the applicable node. It will be noted that in the system of the preferred embodiment, this time is a date-time composite value with sufficient granularity such that there will be no two identical "time inserted" values for any particular process being run utilizing the SQL cache 202-10. If the time-inserted values are equal, the key validation function signals a cache hit condition and the search is complete. If the values are not equal, the search continues utilizing the prior search function of FIG. 2f.

It will be appreciated that the above flow assumes that a number of the key areas contained in the static storage 101-10 of FIG. 2b have been previously populated as a result of the first execution of a corresponding number of SQL statements by the cache manager 202 during SQL processing. That is, as indicated in the SQL processing flow of FIG. 2c, when the search operation performed by cache manager 202 does not result in a "hit", the system will invoke the cache manager's insert in cache function of FIG. 2e. This results in the appropriate code generated by the code generation component being stored in SQL cache 202-10 along with the population of the allocated key area as indicated in FIG. 2c.

In greater detail, as indicated in FIG. 2e, the cache manager 202 allocates and populates a node within the node structure associated with cache 202- 10. This population includes storing a value that represents the time that the code is being inserted into the cache. Lastly, the cache manager 202 invokes the populate key area function of FIG. 2h that populates the key area as indicated in FIG. 2e. More specifically, as indicated in FIG. 2h, the cache manager 202 writes a number of specific "key values" formatted as indicated in FIG. 3 into the allocated key area upon the first execution of such SQL statements. Note that the the key area was initialized to "zero" at program invocation. That is, first the cache manager 202 utilizes the same time value previously captured by the cache manager 202 and stores that time value into the time field of the key. Next, the cache manager 202 stores the Node ID value of the current node into the node id field of the key and then stores the Code Token value associated with the generated code in the code token field of the key.

Thus, when the cache manager's "find in cache" function is invoked, typically, SQL statements that have been previously encountered will have an entry in SQL cache 202-10 and a hit determination of FIG. 2d can be made using only the key validation check logic function of FIG. 2g. Since when replacement occurs, there may be more than one key in existence with the same node id contained therein, the time-inserted check is made by the key validation check logic function to further establish the match.

As indicated in FIG. 2d, in the case where the key mode indicator is "on" and the key has been established for the SQL statement, the cache manager 202 invokes the key validation check logic function of FIG. 2g. When the function validates identical matches between the code token values contained in the key and designated node and between the time values contained in the key and designated node, the cache manager signals that the key is valid that results in a "hit". As discussed, this enables the cache manager to bypass the complex search operation resulting in a substantial increase in performance.

However, as indicated in FIG. 2d, there are several situations where the cache manager 202 will be required to utilize the prior art search function of FIG. 2f. The first case is when the cache manager 202 determines that the key mode function has not been set to the "on" state. The second case is when the key mode function is on but a key has not been established for the SQL statement (i.e. the key area is still in an initialized state). The third case is when the key option is on and a key has been established for a particular SQL statement, but the additional checks performed by the key validation check logic function of FIG. 2g result in the determination that the key is not valid.

As indicated in FIG. 2d, the cache manager 202 will continue the search using the prior search logic function of FIG. 2f and if this results in a cache "hit" and the key mode is on then the cache manager 202 invokes the populate key area function of FIG. 2h to populate the key area.

In greater detail, first the cache manager's populate key area function copies the time-inserted value found in the node structure into the time-inserted field of the key. Next, the function copies the node id of the found node into the node id field of the key. Lastly, the function copies the code token in the found node into the code token field of the key. The condition where a key has not been established can occur if the equivalent SQL statement exists in multiple locations in an application program and all occurrences have not been executed during the current invocation of the program.

In the preferred embodiment, the time-inserted field of a node is initialized to a value of −1 when the node is logically deleted or when the entire SQL cache 202-10 is initialized. Also, during initialization of the SQL runtime routines that are bound with the application, the memory area of the key area is set to binary zero so as to designate an unused key.

From the above, it is seen how the present invention improves system performance of a cache manager in searching for enties within an SQL cache. It will be appreciated that many changes may be made to the preferred embodiment of the present invention without departing from its teachings. For example, the present invention may be used in different types of data processing systems and in processing different types of queries. Furthermore, the present invention may be used when caching the code generated as a result of compiling programming languages other than SQL, or even for systems that convert sequences of complex instruction set (CIS) instructions into sequences cached for execution on reduced instruction set (RISC) processors.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

GLOSSARY access method—The way in which the RDBMS accesses relational data, using hash, indexed, or scan access.

application—A program or set of programs that performs a specific task, such as entering orders and updating inventory records.

attribute—A descriptive characteristic of an entity, such as name, order number, item quantity, and so on. A characteristic such as UNIQUE or NOT NULL that can be applied to a column or other entity. When applied to a SQL statement, may be the statement text, the number, types, and length of the host variables used, the database to which the statement applies, etc.

bucket (hash)—A structure use to hold a set of data elements that differ by a computed value (a hash value). For SQL cache nodes, a hash bucket is represented by a linked list of node entries.

code generation—The RDBMS process that generates executable code for a specific SQL statement instead of executing that statement interpretively.

code segment—The code generated by the RDBMS for a specific SQL statement. Each code segment is stored in the SQL Cache for reuse if the same SQL statement is executed again by the same process.

code_token (node)—An item that uniquely refers to a segment of generated code. May be implemented as a pointer to the memory area containing the generated code.

concurrent access—Two or more processes accessing the same data table or partition at the same time.

cursor—A mechanism designed to allow multi-row results returned by RDBMS to be processed a row at a time in COBOL or Virtual C programs.

data type—A definition of how the data in a column is stored and managed. Commonly used data types include CHARACTER, NUMERIC, and FLOAT.

database—A collection of data that has meaning to an organization or to an individual and that is managed as a unit.

Database Management System (DBMS)—A set of software that controls the creation, organization, and modification of one or more databases, and provides access to the stored data.

Data Definition Language (DDL)—Statements used to define the entities, attributes, and relationships that make up a database. DDL statements in RDBMS include CREATE MODEL, CREATE TABLE, CREATE INDEX, and others.

Data Manipulation Language (DML)—Statements used to access data and potentially to change data content. DML statements in RDBMS include SELECT and UPDATE.

generated code—A reusable set of machine instructions that are produced to execute a particular SQL statement.

hash function—The formula used to generate a hash bucket number from a hash key value, in order to decide where to store or retrieve a data row or other data element.

host variable—Storage allocated by a language processor such as COBOL-85 for use in passing variable information to or from an SQL statement.

indicator variable—An indicator used to notify the application that an exception condition, such as an overflow or truncation error, occurred. When used to indicate the presence of the null value, the indicator is referred to as a null indicator variable.

integrity—The property of being logically correct and consistent. In some cases, this term also implies denying access to unauthorized users and processes.

join—An operation that combines two or more tables based on some common attribute value(s) that the tables share. There is no specific JOIN statement or operator visible to an application developer or user. Any SELECT statement that references multiple tables implies that a join is required.

model—An RDBMS (relational) term that is equivalent to database. A model can include one or more tables.

model_token (node)—A numerical identifier used by the Director component to identify a model that is currently in use.

mru_next (node)—The node id of the next node in the MRU list; has value of NULL_NODE if this is the least recently used node.

mru_prev (node)—The node id of the previous node in the MRU list; has value of NULL_NODE if this is the most recently used node.

next (node)—The node id of the next node in the bucket list; has value of NULL_NODE if this is the last node in the list (i.e. no next).

null indicator variable—An indicator used by the RDBMS to notify the application, or used by the application to notify the RDBMS that a column contains the null value.

num_wds (node)—The size of the generated code in words.

Operational Directory Interface (ODI)—A data definition directory used by RDBMS.

Optimizer—The software component of RDBMS that analyzes each SQL statement and defines the access plan that will produce the optimum performance for the execution of that statement.

prev (node)—The node id of the previous node in the bucket list; has value of NULL_NODE if this is the first node in the list (i.e. no previous).

process—An execution unit, with its own address space which is dispatched to a processor for execution.

query—Used to refer to any SQL statement that causes an access to relational tables, regardless of whether the access is followed by a modification.

Relational Access Manager (RAM)—The part of the RDBMS software that manages relational tables.

Relational database—A database that is defined in terms of entities, attributes, and relationships, and that observes the concepts defined originally by E. F. Codd.

Relational Database Management System (RDBMS)—The INTEREL Software that manages relational databases.

Relational File Manager (RFM)—The part of the RDBMS software that accesses data from relational files, as directed by the Relational Access Manager (RAM).

row—The horizontal component of a table. A row consists of a sequence of values, one for each column of the table.

search condition—The specification of how to identify the desired data in the rows and columns retrieved when processing an SQL statement.

SELECT—An SQL statement that defines the information to be selected from one or more tables. Also a clause that includes the SELECT verb in an SQL statement.

SQL—Originally an acronym for Structured Query Language. Now the name of the language most commonly used to access relational databases.

SQL Cache—Configured memory space in which code segments generated by RDBMS are stored for reuse if the same SQL statement is executed again.

table—The relational component that corresponds to a file in non-relational technology. Tables have two forms: hash and non-hash.

Transaction Processing Routine (TPR)—An application program that processes transactions under control of a transaction monitor. In the context of this publication, the transaction monitor is TP8.

user—An individual who accesses RDBMS databases by means of an application or interactive facility.

What is claimed is:

1. A cache manager for processing SQL statements included within an application that result in the retrieval and storage of data within a database, the cache manager being operatively coupled to a runtime library interface over which the SQL statements are received and the cache manager including an SQL cache for storing code segments generated for executing the SQL statements, the cache manager utilizing a search function for performing lengthy complex search operation involving comparing attributes of each SQL statement for locating an applicable code segment stored in the SQL cache to execute the particular SQL statement, the system further including:

(a) static storage being associated with the runtime library interface, the static storage having a plurality of key areas for storing a corresponding number of key values, each key value established for each previously processed SQL statement; and, (b) the cache manager being operative for each SQL statement for which a key value has been established to access the key area within the static storage associated with the SQL statement to obtain the key value for locating the applicable code segment stored in the SQL cache for executing the SQL statement bypassing the search function.

2. The system of claim 1 wherein the cache manager further includes a key mode function indicator whose state defines whether the runtime library interface has allocated a key area in static storage to be used when searching for applicable code segments in the SQL cache in response to SQL statements included in an application, the cache manager being operative to access the key area only when the cache manager determines that the key mode function indicator has been set to an "on" state.

3. The system of claim 1 wherein the cache manager further includes:

a key validation check logic function for performing a series of validation checks on the key value utilizing information including the predetermined time value in the node entry designated by the key value for determining if the key is valid.

4. The system of claim 3 wherein each key value includes a number of fields, the fields including a first field for storing a numerical value that represents the time when a code entry was inserted into the SQL cache, a second field for storing a number used to identify a node entry within the node structure and a third field for storing a code token value for identifying a particular generated code segment and wherein the key validation check logic function performs the series of validation checks by successively comparing the key code token value with the code token value contained in the node entry and the key time value with the predetermined time value contained in the node entry, the key validation check logic function causing the signaling of a hit condition when both comparisons produce matches, the signaling of the hit condition causing bypassing of the search function.

5. The system of claim 4 wherein the key validation check logic function in the absence of an identical match from any one of the successive comparisons causes signaling of an invalid key resulting in the cache search function performing the complex search operation for locating the applicable code segment for executing the SQL statement.

6. A relational database management system (RDBMS) for processing SQL statements included within an application that result in the retrieval and storage of data within a database, the database system including a cache manager and a runtime library interface located between the application and the RDBMS, the cache manager including an SQL cache for storing code segments generated for executing the SQL statements processed by the database system and the cache manager utilizing a search function for performing a complex search operation involving comparing attributes of each SQL statement for locating an applicable code segment stored in the SQL cache to execute the particular SQL statement, the system further including:

(a) static storage associated with the runtime library interface, the static storage having a plurality of key areas for storing a corresponding number of key values, each key value established for each previously processed SQL statement; and, (b) the cache manager testing a key mode function indicator; when the key mode function indicator is on, the cache manager being operative in searching for a generated code segment for each SQL statement encountered in the application to access the key area within the static storage associated with the SQL statement to obtain the key value for locating the applicable generated code segment stored in the SQL cache for executing the SQL statement, bypassing the search function.

7. The system of claim 6 wherein the SQL cache includes a node structure containing a number of node entries associated with generated code segments stored in the SQL cache, each node entry containing information for locating the generated code segments and wherein each node entry further includes a predetermined time value within a time inserted field to be used by the cache manager in validating the key value before signaling that the applicable generated code segment is stored in the SQL cache.

8. The system of claim 7 wherein the cache manager further includes:

a key validation check logic function for performing a series of validation checks on the key value utilizing information including the predetermined time value in the node entry designated by the key value for determining if the key is valid.

9. The system of claim 8 wherein each key value includes a number of fields, the fields including a first field for storing a numerical value that represents the time when a code entry was inserted into the SQL cache, a second field for storing a number used to identify a node entry within the node structure, and a third field for storing a code token value for identifying a particular generated code segment and wherein the key validation check logic function performs the series of validation checks by successively comparing the key code token value with the code token value contained in the node entry and the key time value with the predetermined time value contained in the node entry, the key validation check logic function causing the signaling of a hit condition when both comparisons produce matches, the signaling of the hit condition causing bypassing of the search function.

10. The system of claim 9 wherein the key validation check logic function in the absence of an identical match from any one of the successive comparisons causes signaling of an invalid key resulting in the cache search function performing the complex search operation for locating the applicable code segment for executing the SQL statement.

11. The system of claim 9 wherein the time inserted field is initialized to a −1 value when the entire SQL cache is initialized by the system and wherein the first, second and third fields of the key value of an unused key are set to binary ZEROS.

12. The system of claim 6 wherein the runtime library interface includes a number of runtime support routines, each runtime support routine contained in the runtime library interface including a key mode indicator for designating if a particular runtime routine can bypass a complex search operation by utilizing key values stored in the static storage to obtain applicable generated code segments.

13. The system of claim 12 wherein the runtime library interface accesses the static storage key area allocated to each application SQL statement and passes to the cache manager, a reference to the key area for storing the key value along with the associated SQL statement.

14. The system of claim 6 wherein at initialization, all of the key areas of the static storage are set to the same predetermined value.

15. The system of claim 6 wherein the SQL cache includes a node structure containing a number of entries associated with generated code segments stored in the SQL cache and wherein the cache manager is invoked by the RDBMS during the initial processing of each SQL statement to execute an insert operation, the cache manager being operative to allocate and populate the node structure by inserting a node entry therein containing information for locating the generated code segment for executing the particular SQL statement and when the key mode function is on, capturing a current time value and inserting the current time value in the node entry and the cache manager populating the key area allocated to the particular SQL statement with a key value to be associated with the SQL statement.

16. The system of claim 15 wherein the cache manager populates the key area by storing the previously captured time value in a time-inserted field of the key value, storing the node id of the node entry in a node-id field of the key value and storing a code token of the generated code segment in a code token field of the key value.

17. The system of claim 6 wherein the cache manager in response to a key value having not been established invokes the search function to perform a complex search operation for locating the applicable code segment in the SQL cache.

18. A method of improving the performance of a cache manager within a relational database management system (RDBMS) in searching for applicable code segments within a SQL cache included therein for executing SQL statements contained in an application, the cache manager invoking a search function for performing complex search operations for locating the applicable generated code segments stored in the SQL cache, the method comprising the steps of (a) allocating a plurality of key areas within a key structure for storing a corresponding number of key values, each key value being established for each SQL statement for which a code segment is generated during the processing of the statement and stored in the SQL cache; and, (b) accessing the key area within the key structure for each SQL statement for which a key value has been established to obtain the key value to locate the applicable code segment in the SQL cache for executing a particular SQL statement, bypassing the search function.

19. The method of claim 18 wherein the method further includes the step of:

(c) testing a key mode function indicator whose state defines whether the application is to utilize the key structure in locating applicable generated code segments in the SQL cache; and, (d) when the result of performing step (c) indicates that the key mode function indicator has been set to an "on" state, performing operations of step (b) to locate the applicable generated code segment in the SQL cache.

20. The method of claim 18 wherein the SQL cache includes a node structure containing a number of node entries associated with the generated code segments stored in the SQL cache, each node entry containing information for locating the generated code segment, the information including a time value representing the time that the associated code segment was inserted in the cache, the method further including the steps of:

(e) performing a series of validation checks on the key value utilizing information including the time value for determining if the key is valid; and, (f) when the result of step (e) indicates that the key value is valid, signaling that the applicable generated code segment is stored in the SQL cache.

21. The method of claim 20 wherein each key value includes a number of fields, a first field for storing a numerical value that represents the time when a code entry was inserted into the SQL cache, a second field for storing a number used to identify a node entry within the node structure and a third field for storing a code token value for identifying a particular generated code segment and wherein step (e) includes the steps of successively comparing the key code token value with the code token value contained in the node entry and the key time value with the predetermined time value contained in the node entry, and when both comparisons produce matches signaling that the key is valid.

22. The method of claim 20 wherein step (e) indicates that the key is invalid, the method further including the step of:

(g) invoking the cache search function to perform a complex search operation for locating an applicable generated code segment in the SQL cache.

23. The method of claim 18 wherein step (b) includes passing an address value along with each SQL statement for accessing the key area allocated to the statement for accessing the corresponding key value within the key structure.

24. The method of claim 18 wherein the SQL cache includes a node structure containing a number of node entries containing information for locating generated code segments therein and wherein the cache manager is invoked during the processing of each new SQL statement to execute an insert operation, the method further including the steps of (h) allocating a node in the node structure for locating the generated code segment inserted into the SQL cache for executing the particular SQL statement; and, (i) populating the node and allocated key area with the key value to be associated with the particular SQL statement.

25. The method of claim 24 wherein step (i) includes the steps of:

(1) capturing a time value denoting the time when the SQL statement is inserted in the SQL cache;

(2) inserting the time value into a time-inserted field of both the node and key value;

(3) inserting a numerical value identifying the allocated node into a node-id field of the key value; and, (4) inserting a code token value identifying the generated code segment stored in the SQL cache into a code token field of the key value.

* * * * *